(12) United States Patent
Chuang

(10) Patent No.: US 11,303,477 B2
(45) Date of Patent: Apr. 12, 2022

(54) ENHANCEMENT ON SOUNDING REFERENCE SIGNAL TRANSMISSION

(71) Applicant: Mediatek Inc., Hsinchu (TW)

(72) Inventor: Chiao Yao Chuang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 8 days.

(21) Appl. No.: 17/061,674

(22) Filed: Oct. 2, 2020

(65) Prior Publication Data

US 2021/0105156 A1    Apr. 8, 2021

Related U.S. Application Data

(60) Provisional application No. 62/994,946, filed on Mar. 26, 2020, provisional application No. 62/939,736, filed on Nov. 25, 2019, provisional application No. 62/915,047, filed on Oct. 15, 2019, provisional application No. 62/912,705, filed on Oct. 9, 2019, provisional application No. 62/910,572, filed on Oct. 4, 2019.

(51) Int. Cl.
| | |
|---|---|
| *H04L 25/02* | (2006.01) |
| *H04L 5/00* | (2006.01) |
| *H04L 27/26* | (2006.01) |
| *H04L 27/38* | (2006.01) |

(52) U.S. Cl.
CPC ........ *H04L 25/0226* (2013.01); *H04L 5/0051* (2013.01); *H04L 27/2607* (2013.01); *H04L 27/3872* (2013.01); *H04L 5/0007* (2013.01)

(58) Field of Classification Search
None
See application file for complete search history.

(56) References Cited

U.S. PATENT DOCUMENTS

| | | | |
|---|---|---|---|
| 2011/0098054 A1* | 4/2011 | Gorokhov | H04L 5/0035 455/452.1 |
| 2011/0261716 A1* | 10/2011 | Kim | H04L 25/0226 370/252 |
| 2011/0280220 A1* | 11/2011 | Jia | H04W 56/00 370/335 |
| 2013/0286994 A1* | 10/2013 | Liu | H04L 5/0051 370/329 |
| 2015/0289264 A1* | 10/2015 | Sandberg | H04L 1/0026 370/329 |
| 2019/0081660 A1* | 3/2019 | Han | H04L 27/2613 |
| 2019/0081722 A1* | 3/2019 | Takeda | H04W 72/0446 |

(Continued)

*Primary Examiner* — Otis L Thompson, Jr.
(74) *Attorney, Agent, or Firm* — Locke Lord LLP; Tim Tingkang Xia, Esq.

(57) ABSTRACT

A UE determines a respective set of subcarriers from N subcarriers in each OFDM symbol of M1 consecutive OFDM symbols within a slot. The respective set of subcarriers carries a respective set of SRSs that form transmission combs of a transmission comb size. The respective set of subcarriers in one of the M1 consecutive OFDM symbols do not overlap in frequency domain with the respective set of subcarriers in any other one of the M1 consecutive OFDM symbols. The UE applies the respective set of phase rotations to the respective set of SRSs in each OFDM symbol to obtain a cyclic shift. The UE maps the respective set of SRSs applied with phase rotations to the respective set of subcarriers in each OFDM symbol. The UE transmits the respective sets of SRSs in the M OFDM symbols.

20 Claims, 14 Drawing Sheets

(56) References Cited

U.S. PATENT DOCUMENTS

| | | | |
|---|---|---|---|
| 2019/0215204 A1* | 7/2019 | Shim | H04L 25/02 |
| 2019/0260535 A1* | 8/2019 | Moroga | H04L 5/0073 |
| 2019/0296874 A1* | 9/2019 | Chung | H04W 72/0406 |
| 2020/0099434 A1* | 3/2020 | Wang | H04B 7/0626 |
| 2020/0337029 A1* | 10/2020 | Yi | H04W 72/042 |
| 2021/0022117 A1* | 1/2021 | Yi | H04L 5/0048 |
| 2021/0105156 A1* | 4/2021 | Chuang | H04L 27/2607 |
| 2021/0135823 A1* | 5/2021 | Zhang | H04B 7/0691 |

* cited by examiner

|  | $l=0$ | $l=1$ | $l=2$ | $l=3$ | $l=4$ | $l=5$ | $l=6$ | $l=7$ | $l=8$ | $l=9$ | $l=10$ | $l=11$ |
|---|---|---|---|---|---|---|---|---|---|---|---|---|
| Comb=2 | 0 | 1 | 0 | 1 | 0 | 1 | 0 | 1 | 0 | 1 | 0 | 1 |
| Comb=4 | 0 | 2 | 1 | 3 | 0 | 2 | 1 | 3 | 0 | 2 | 1 | 3 |
| Comb=8 (1st) | 0 | 4 | 1 | 5 | 2 | 6 | 3 | 7 | 0 | 4 | 1 | 5 |
| Comb=8 (2nd) | 0 | 4 | 2 | 6 | 1 | 5 | 3 | 7 | 0 | 4 | 2 | 6 |

FIG. 9

|  | $l=0$ | $l=1$ | $l=2$ | $l=3$ | $l=4$ | $l=5$ | $l=6$ | $l=7$ | $l=8$ | $l=9$ | $l=10$ | $l=11$ |
|---|---|---|---|---|---|---|---|---|---|---|---|---|
| Comb=4 | 0 | 2 | 0 | 2 | 0 | 2 | 0 | 2 | 0 | 2 | 0 | 2 |
| Comb=8 (1st) | 0 | 4 | 2 | 6 | 0 | 4 | 2 | 6 | 0 | 4 | 2 | 6 |
| Comb=8 (2nd) | 0 | 4 | 0 | 4 | 0 | 4 | 0 | 4 | 0 | 4 | 0 | 4 |

FIG. 10

ENHANCEMENT ON SOUNDING REFERENCE SIGNAL TRANSMISSION

CROSS-REFERENCE TO RELATED APPLICATION(S)

This application claims the benefit of U.S. Provisional Application Ser. No. 62/910,572, entitled "ENHANCED SRS DESIGN FOR NR POSITIONING" and filed on Oct. 4, 2019; U.S. Provisional Application Ser. No. 62/912,705, entitled "ENHANCED SRS DESIGN FOR NR POSITIONING" and filed on Oct. 9, 2019; U.S. Provisional Application Ser. No. 62/915,047, entitled "ENHANCED SRS DESIGN FOR NR POSITIONING (RELATIVE RE OFFSET PATTERN FOR PARTIAL STAGGERING)" and filed on Oct. 15, 2019; U.S. Provisional Application Ser. No. 62/939,736, entitled "ENHANCED SRS DESIGN" and filed on Nov. 25, 2019; and U.S. Provisional Application Ser. No. 62/994,946, entitled "ENHANCED SRS DESIGN" and filed on Mar. 26, 2020; all of which are expressly incorporated by reference herein in their entirety.

BACKGROUND

Field

The present disclosure relates generally to communication systems, and more particularly, to techniques of generating sounding reference signals (SRSs) by a user equipment (UE).

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE determines a respective set of subcarriers from N subcarriers in each OFDM symbol of M consecutive OFDM symbols within a slot. The respective set of subcarriers carries a respective set of sounding reference signals (SRSs) that form transmission combs of a transmission comb size, M OFDM symbols including initial M1 consecutive OFDM symbols and subsequent M2 consecutive OFDM symbols, M and M1 each being an integer greater than 0, M2 being an integer greater than or equal to 0. The respective set of subcarriers in one of the M1 consecutive OFDM symbols do not overlap in frequency domain with the respective set of subcarriers in any other one of the M1 consecutive OFDM symbols.

The UE determines a respective set of phase rotations corresponding to the respective set of SRSs in each OFDM symbol of the M consecutive OFDM symbols. A given phase rotation in the respective set further rotating a predetermined phase value than a phase rotation in the respective set prior to the given phase rotation.

The UE applies the respective set of phase rotations to the respective set of SRSs in each OFDM symbol of the M1 consecutive OFDM symbols to obtain a cyclic shift. The UE maps the respective set of SRSs applied with phase rotations to the respective set of subcarriers in each OFDM symbol of the M1 consecutive OFDM symbols. When M2 is greater than 0, the UE repeats, in the M2 consecutive OFDM symbols, at least one portion of the SRSs applied with phase rotations in the M1 consecutive OFDM symbols such that all SRSs in the M2 consecutive OFDM symbols are mapped in accordance with the SRSs applied with phase rotations in the M1 consecutive OFDM symbols. The UE transmits the respective sets of SRSs in the M OFDM symbols.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 9 shows a table indicating the subcarrier index of the initial RE carrying an SRS in 12 OFDM symbols.

FIG. 10 shows another table indicating the subcarrier index of the initial RE carrying an SRS in 12 OFDM symbols.

DETAILED DESCRIPTION

Figure 1:
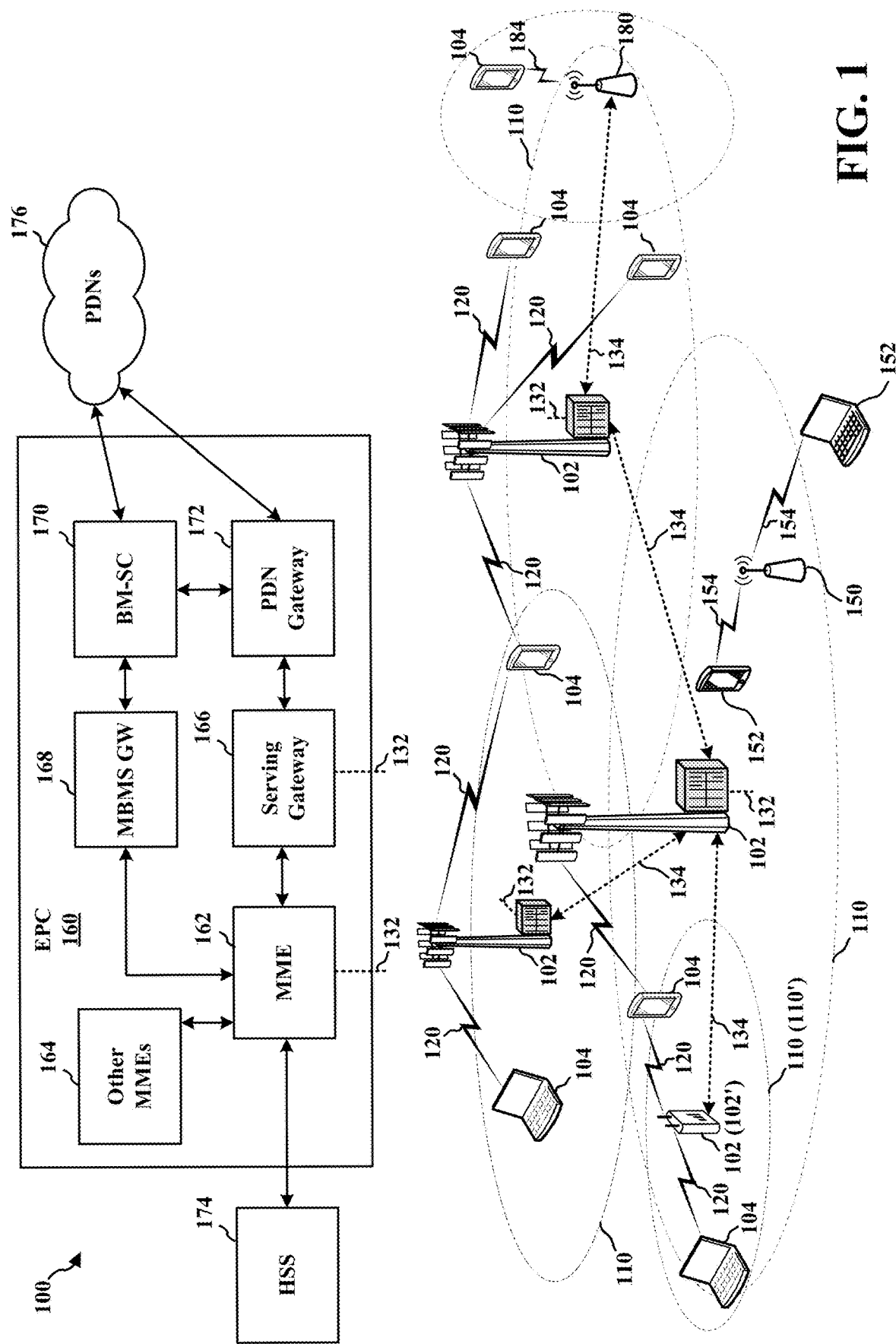
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and a core network 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the core network 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the core network 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station gNB 180 may utilize beamforming 184 with the UE 104 to compensate for the extremely high path loss and short range.

The core network 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the core network 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to PDNs 176. The PDNs 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the core network 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
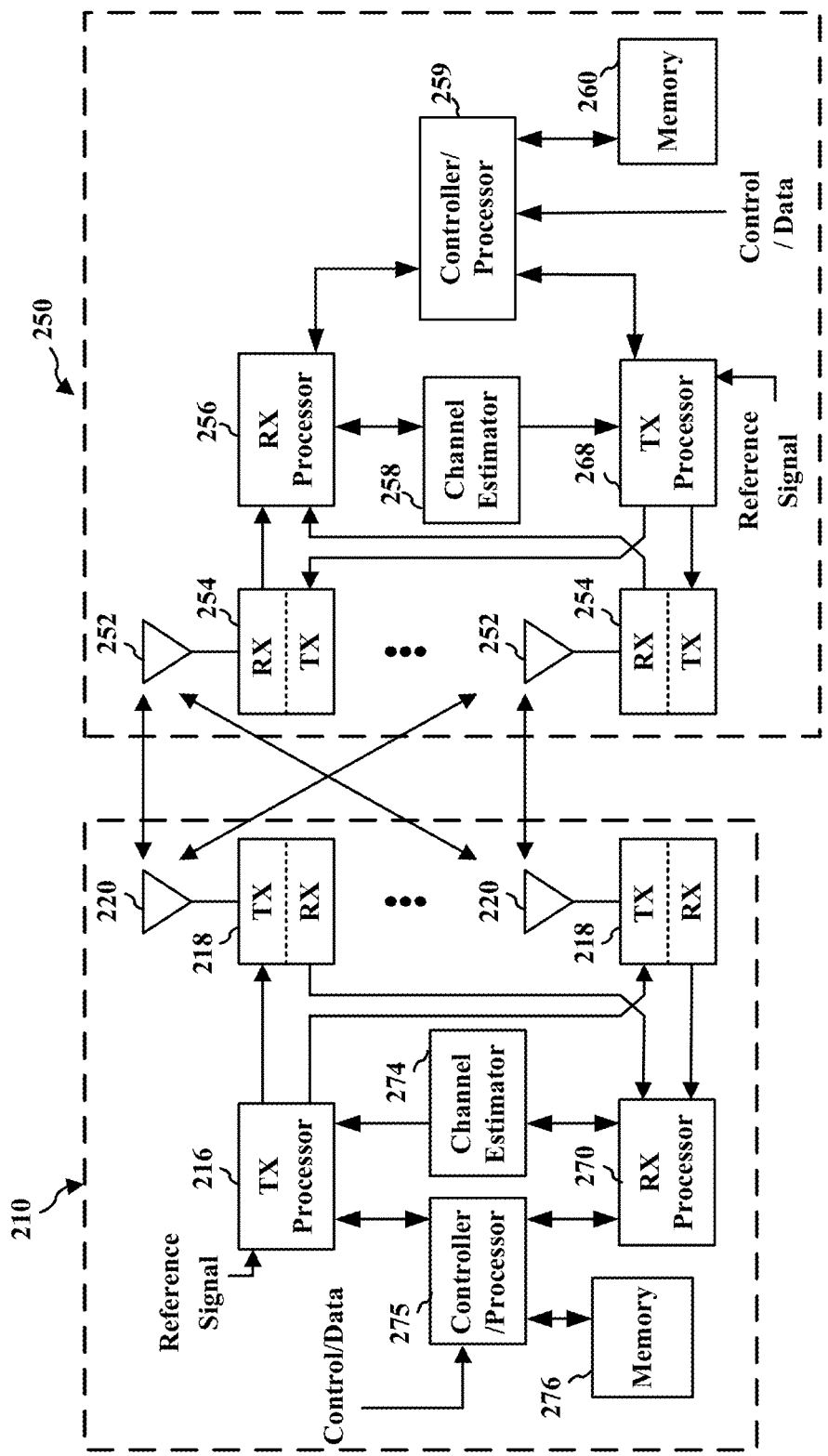
FIG. 2 is a diagram illustrating a base station in communication with a UE in an access network.

FIG. 2 is a block diagram of a base station 210 in communication with a UE 250 in an access network. In the DL, IP packets from the core network 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/ demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the core network 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the core network 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.125 ms duration or a bandwidth of 15 kHz over a 0.5 ms duration. Each radio frame may consist of 20 or 80 subframes (or NR slots) with a length of 10 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 5 and 6. [Harrison: MHZ→MHz]

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
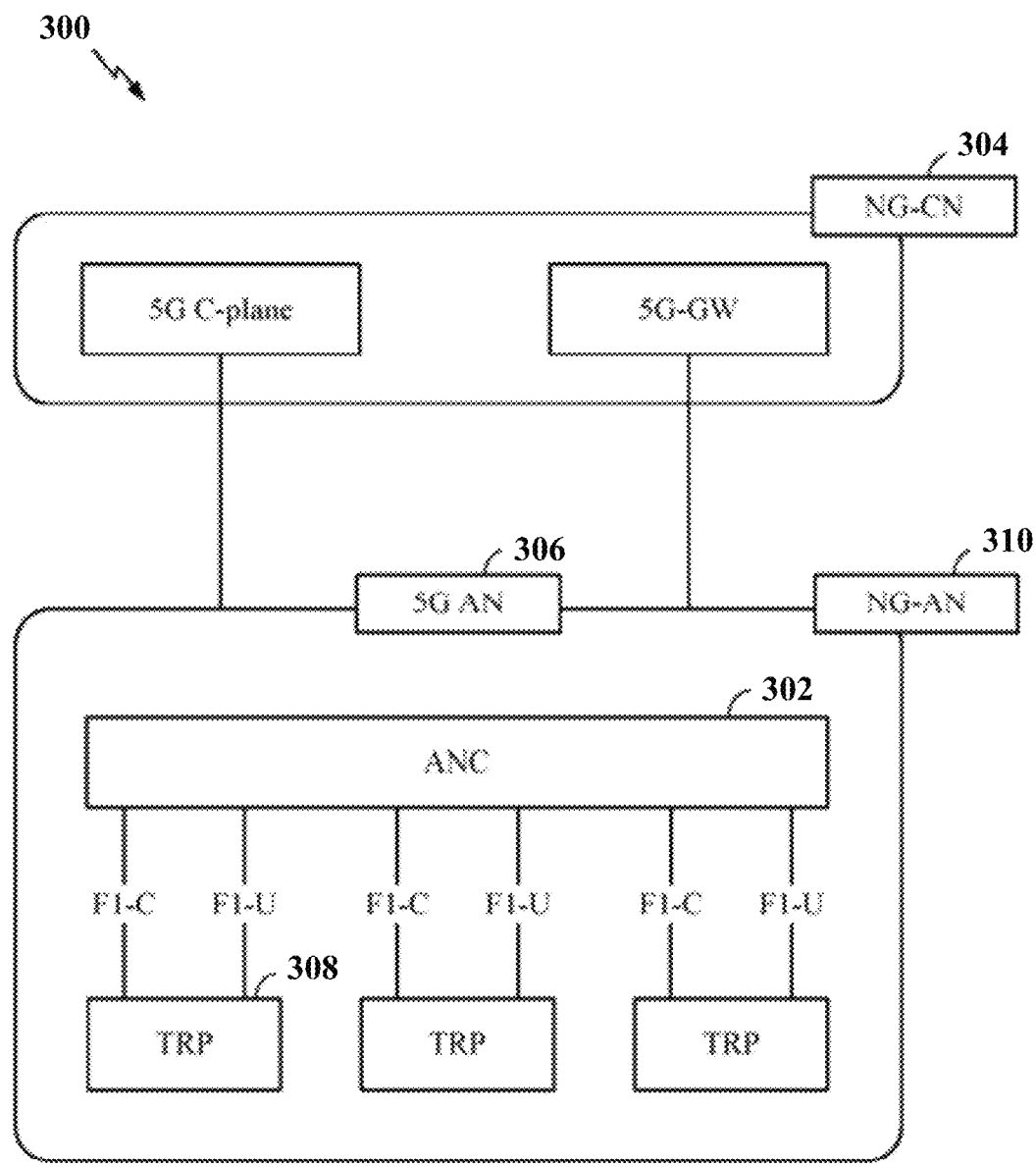
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
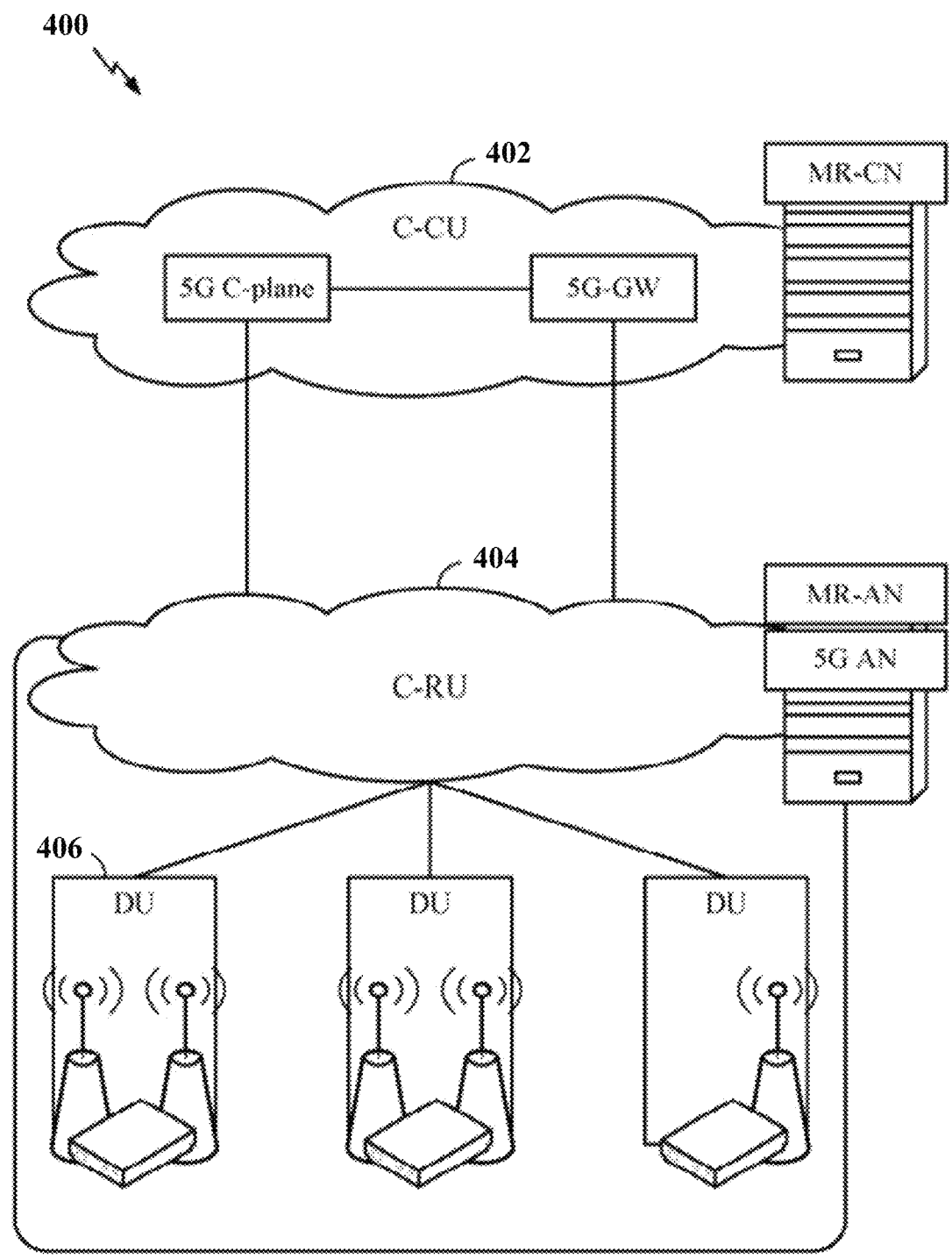
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
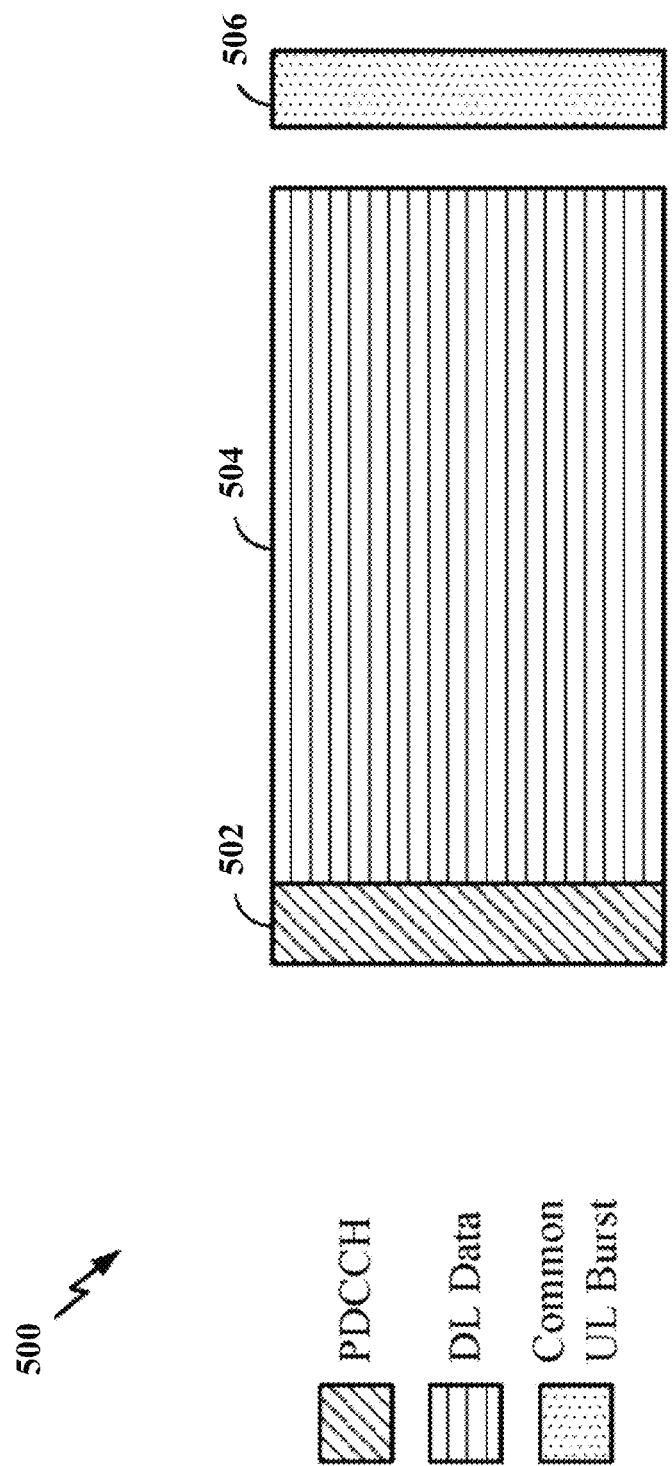
FIG. 5 is a diagram showing an example of a DL-centric subframe.

FIG. 5 is a diagram 500 showing an example of a DL-centric subframe. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6:
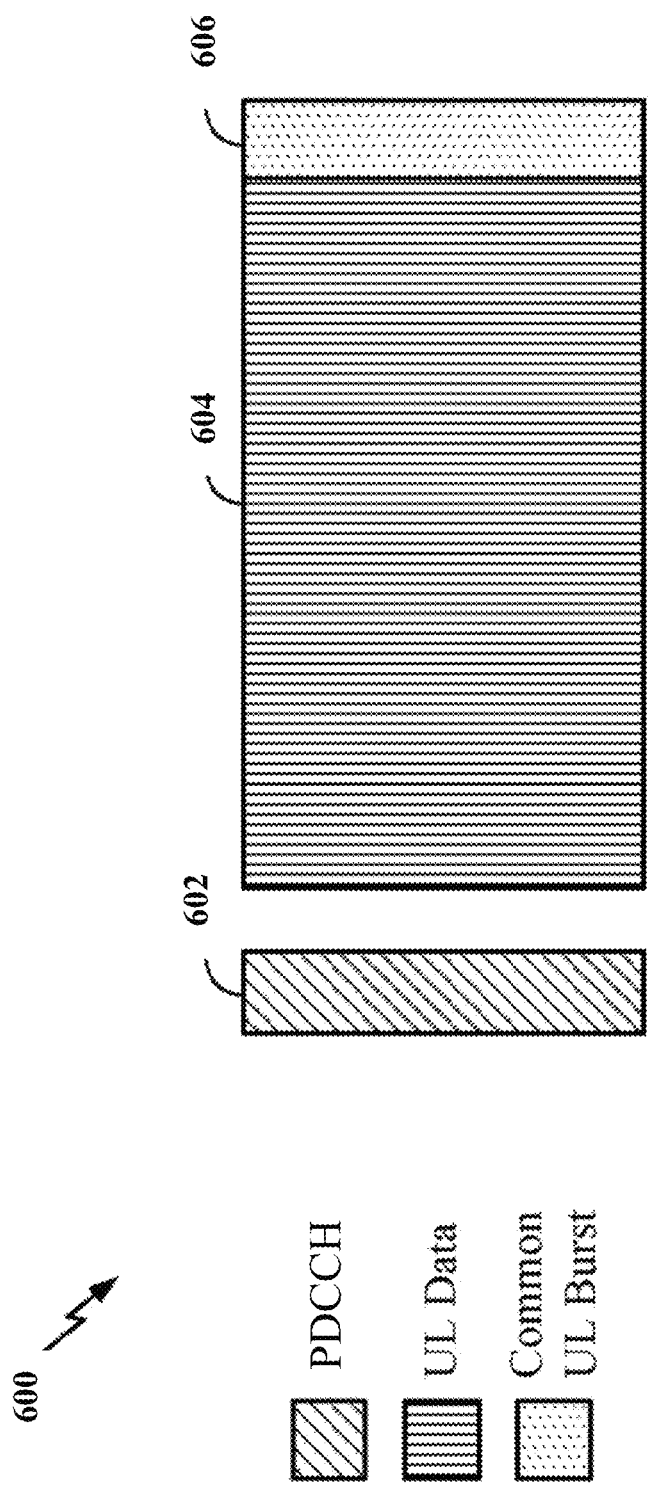
FIG. 6 is a diagram showing an example of an UL-centric subframe.

FIG. 6 is a diagram 600 showing an example of an UL-centric subframe. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the pay load of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
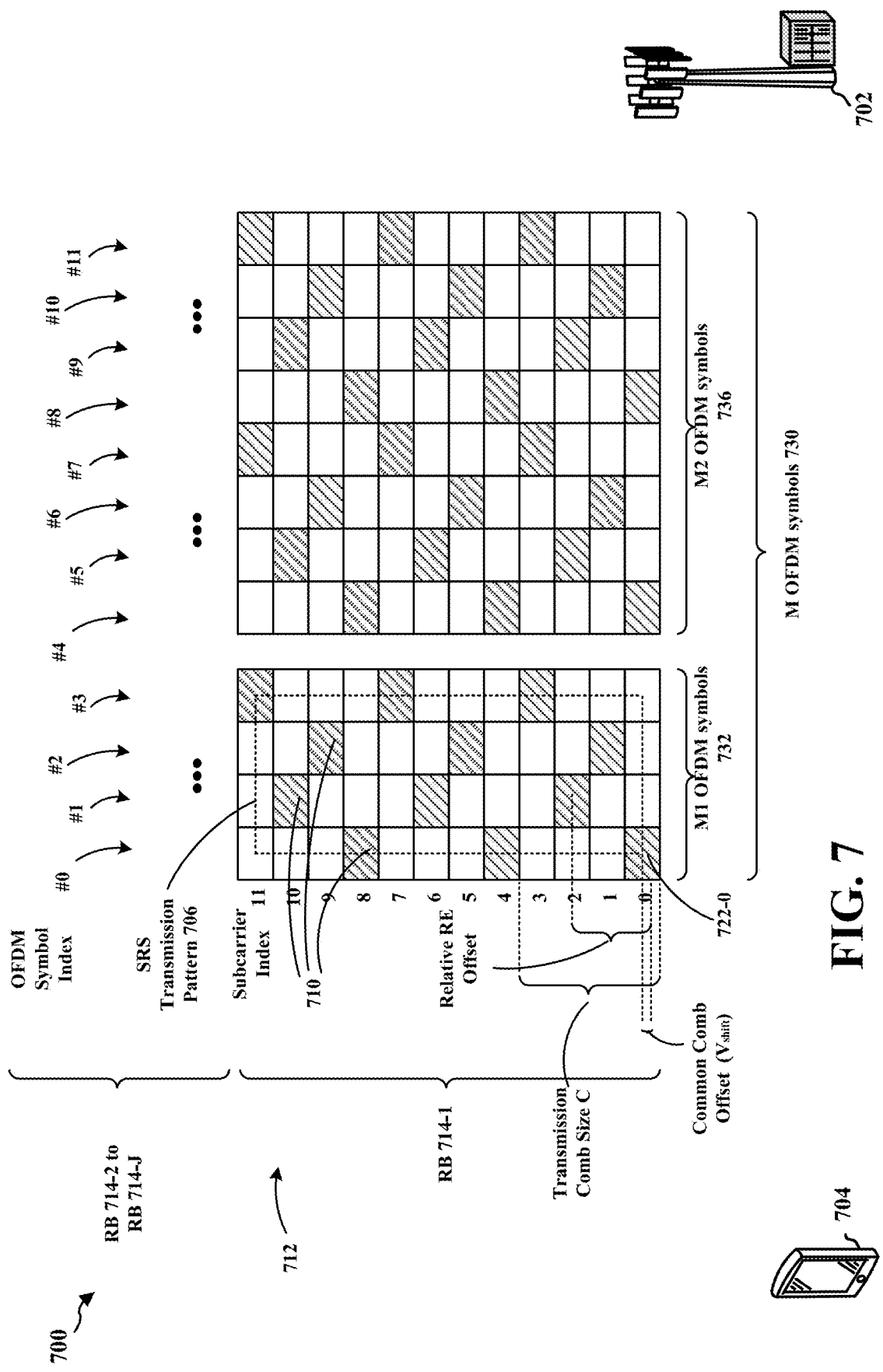
FIG. 7 is a diagram illustrating transmission of SRSs from a UE to a base station.

FIG. 7 is a diagram 700 illustrating transmission of SRSs 710 from a UE 704 to a base station 702. In particular, the UE 704 transmits the SRSs 710 in multiple consecutive OFDM symbols. In this example, the SRSs 710 are transmitted in each OFDM symbol of OFDM symbols #0 to #11, which are indexed from 0 to 11. Further, the SRSs 710 are transmitted within a transmission bandwidth 712. In this example, the transmission bandwidth 712 contains consecutive resource blocks 714-1 to 714-J. Each resource block may contain 12 subcarriers. For example, FIG. 7 shows that the resource block 714-1 contains subcarriers #0 to #11.

In the techniques described infra, the UE 704 may arrange the SRSs 710 in one or more transmission patterns. That is, certain resource elements (REs) in an OFDM symbol may be selected to carry the SRSs 710 to form a transmission pattern. More specifically, the SRSs 710 are arranged in a transmission pattern occupying M consecutive OFDM symbols 730. In this example, M is 12. Further, the M consecutive OFDM symbols 730 are divided into two sections: a first section with initial M1 consecutive OFDM symbols 732 and a second section with subsequent M2 consecutive OFDM symbols 736. M1 is an integer greater than 0. M2 is an integer greater than or equal to 0. In this example, M1 is 4 and M2 is 8. In certain configurations, the SRSs 710 form a sub-pattern in the M1 consecutive OFDM symbols 732. The SRSs 710 in the M2 consecutive OFDM symbols 736 may repeat the sub-pattern in the M1 consecutive OFDM symbols. Further, the SRSs 710 in each of the OFDM symbols #0 to #11 form transmission combs with a particular transmission comb size C. In this example, the transmission comb size is 4.

Further, M1 can be configured to be less than or equal to the transmission comb size C. As described infra, when the M1 is less than transmission comb size C, the receiver (e.g., the base station 702) obtains a partial-symbol observation range. When the M1 is equal to the transmission comb size C, the receiver (e.g., the base station 702) obtains a full-symbol observation range.

An offset of a particular RE carrying an SRS from the RE on the subcarrier 0 in each OFDM symbol of the OFDM symbols #0 to #11 can be expressed as the summation of a common comb offset and a relative RE offset modulo on the transmission comb size, as follows:

RE offset=(common comb offset+relative RE offset) mod(transmission comb size)

The relative RE offset is defined as the RE offset in the OFDM symbol other than the first (initial) OFDM symbol relative to the first (initial) OFDM symbol in the first OFDM symbol for an SRS resource transmission. The common comb offset is defined as the RE offset which is common to all configured symbols in an SRS resource.

Further, for each OFDM symbol in the OFDM symbols #0 to #11, the UE 704 may generate a sequence of SRSs to be mapped to the selected REs according to a selected pattern. The SRSs in each OFDM symbol of the OFDM symbols #0 to #11 may be generated based on the Zadoff-Chu (ZC) sequence. For example, the REs on subcarriers 0, 4, 8 in each of the resource blocks 714-1 to 714-J in the OFDM symbol #0 are mapped with SRSs derived from the ZC sequence (or from other sequences in other examples). More specifically, the SRS carried on the subcarrier 0 in the OFDM symbol #0 may be derived from the first (initial) value of the ZC sequence; the SRS carried on the subcarrier 4 in the OFDM symbol #0 may be derived from the second (next) value of the ZC sequence; the SRS carried on the subcarrier 8 in the OFDM symbol #0 may be derived from the third value of the ZC sequence, and so on.

In addition, the UE 704 may apply a respective phase rotation to each SRS mapped to a RE in the OFDM symbols #0 to #11 to equivalently generate cyclic shift in time domain for SRS transmission. The cyclic shift in time domain is equivalent to induce the time delay for transmission. As described infra, the phase rotation pattern can be based on the RE offset pattern to increase UE multiplexing capacity. To obtain cyclic shifts on the SRSs mapped in the OFDM symbols #0 to #11, phase rotations are applied to those SRSs. The phase rotation amount applied to an SRS depend on the number $N_{symbol}^{SRS}$ of configured OFDM symbols (e.g., the M1 consecutive OFDM symbols 732) for an SRS resource; a transmission comb size $K_{TC}$; the order of the occupied subcarriers within the transmission bandwidth 712; and scaling (p) on the maximum number of cyclic shifts ($N_{max}^{cs}$) to increase UE multiplexing capacity.

More specifically, the order of the occupied subcarriers within the transmission bandwidth 712 can be realized by the combination of: the relative RE offset in the OFDM symbol other than the first one to the first OFDM symbol for a SRS resource transmission, the common comb offset for all symbols in a SRS resource (which may be configured through higher layer), the transmission comb size, and SRS index in each OFDM symbol for transmission. Further, several scaling factors can be configured for the parameter p.

The phase rotation quantity is linear with respect to the occupied subcarriers by reference signals in an SRS resource within the transmission bandwidth 712. The cyclic shift operation can utilize some or all the allowed cyclic shift positions, especially for the case where the configured symbol number of an SRS resource is less than the transmission comb size.

FIG. 7 shows a transmission pattern having a full-symbol observation range, where the transmitted SRSs 710 in the M1 OFDM symbols (e.g., OFDM symbols #0 to #3) occupy all the subcarriers within the transmission bandwidth 712. Further, in this example, the M1 and the transmission comb size $K_{TC}$ are equal; both are 4. As such, the base station 702 (the receiver) may properly combine all the received SRSs 710 to achieve the observation of channel impulse response with an OFDM symbol time period. In particular, the number of subcarriers occupied by the SRSs 710 is the same in each OFDM symbol of the M1 OFDM symbols. Further, the number of subcarriers occupied by the SRSs 710 could be less than or equal to the total number of subcarriers on the transmission bandwidth 712.

Figure 8:
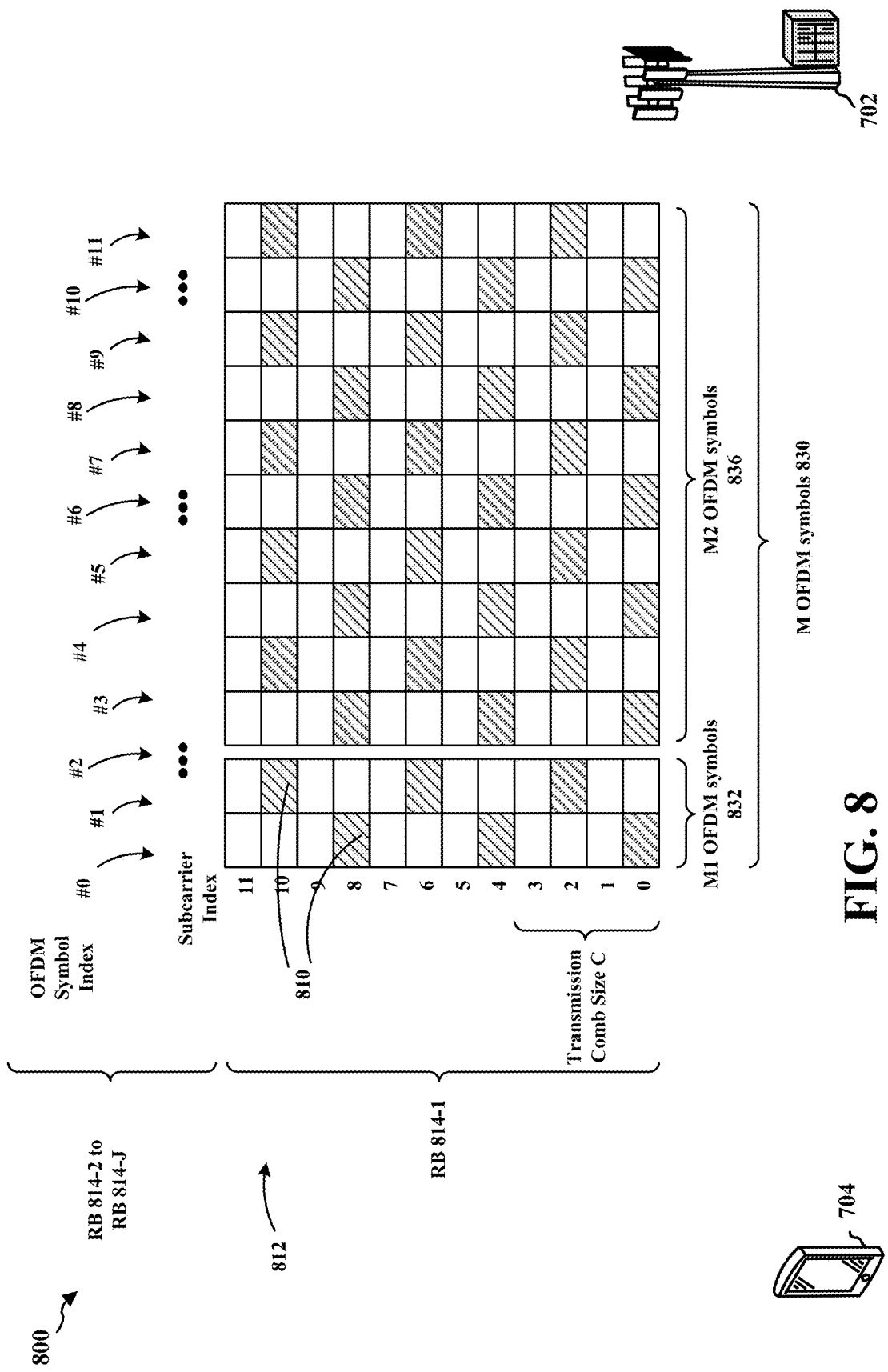
FIG. 8 is another diagram illustrating transmission of SRSs from the UE to the base station.

FIG. 8 is another diagram 800 illustrating transmission of SRSs 810 from the UE 704 to the base station 702. Similar to the pattern described supra referring to FIG. 7, the SRSs 810 are transmitted on M consecutive OFDM symbols 830, which includes OFDM symbols #0 to #11. Further, the M consecutive OFDM symbols 830 include an initial M1 consecutive OFDM symbols 832 and a subsequent M2 consecutive OFDM symbols 836. In this example, M1 is 2 and M2 is 10.

Further, in this example, the transmission pattern has a partial-symbol observation range, where the transmitted reference signals in the M1 consecutive OFDM symbols 832 occupy a proper subset of all the subcarriers within the transmission bandwidth 812. Further, in this example, the M1 is less than the transmission comb size. More specifically, the M1 consecutive OFDM symbols 832 contains OFDM symbols #0 to #1. M1 is 2 and the transmission comb size C is 4. In each resource block of the resource blocks 814-1 to 814-J, the SRSs 810 in the OFDM symbols #0 to #1 occupy subcarriers #0, #2, #4, #6, #8, #10, and do not occupy subcarriers #1, #3, #5, #7, #9, #11.

In certain configurations, the occupied subcarriers may be all equally spaced, the receiver may properly combine all the received reference signals to achieve the observation of channel impulse response shorter than an OFDM symbol time period. The observation can be ½, ⅓, or ¼ of an OFDM symbol time period. The occupied subcarrier number of reference signals in each symbol of a resource is the same as that in any other symbol of the same resource Note that, the occupied subcarrier number of reference signals in each symbol of a resource could be less than or equal to that on all the symbols of a resource. In particular, the number of subcarriers occupied by the SRSs 810 is the same in each OFDM symbol of the M1 OFDM symbols. Further, the number of subcarriers occupied by the SRSs 810 could be less than or equal to the total number of subcarriers on the transmission bandwidth 812.

In addition, the REs carrying SRSs in each OFDM symbol of the M1 consecutive OFDM symbols 732/M1 consecutive OFDM symbols 832 are offset from the REs carrying SRSs in any other OFDM symbol of the M1 consecutive OFDM symbols 732/M1 consecutive OFDM symbols 832. Such an RE offset pattern for carrying SRSs may increase the observation range.

Referring back to FIG. 7, the subcarrier index of the initial RE carrying an SRS in a particular OFDM symbol is:

$$\left(\pm (l\bmod K_{TC}) * \frac{K_{TC}}{2} \pm \left\lfloor \frac{l\bmod K_{TC}}{2} \right\rfloor + V_{shift}\right)\bmod K_{TC}.$$

$K_{TC}$ represents the transmission comb size C. $V_{shift}$ represents a common comb offset configured from higher layer for a particular antenna port. A common comb offset is an offset of an entire transmission pattern 706 relative to the subcarrier #0. In this example, $V_{shift}$ is 0. l represents the symbol index within the M1 OFDM symbols. The configured M1 OFDM symbols in a slot is greater than or equal to 1 OFDM symbol and less than or equal to 12 OFDM symbols. Further, M1 can be less than or equal to the transmission comb size $K_{TC}$.

In certain configurations, M1 is equal to the transmission comb size $K_{TC}$ and M2 is greater than or equal to 0. In particular, $K_{TC}$ can be one of 2, 4, and 8.

In certain configurations, when $K_{TC}$ is 8, and when M1 is equal to the transmission comb size $K_{TC}$ and M2 is greater than or equal to 0 or when M1 is less than the predetermined transmission comb size and M2 is equal to 0, the subcarrier index of the initial RE carrying an SRS in a particular OFDM symbol is:

$$\left(\pm (l\bmod K_{TC}) * \frac{K_{TC}}{2} \pm \left(2 * \left\lfloor \frac{l\bmod K_{TC}}{2} \right\rfloor\right)\bmod\left(\frac{K_{TC}}{2}\right) \pm \left\lfloor \frac{l\bmod K_{TC}}{4} \right\rfloor + V_{shift}\right)\bmod K_{TC}$$

FIG. 9 shows a table indicating the subcarrier index of the initial RE carrying an SRS in 12 OFDM symbols with transmission comb sizes 2, 4, and 8 according to the above equations.

Referring to FIG. 8, in certain configurations, M1 is less than the transmission comb size $K_{TC}$ and M2 is greater than 0. The configured M1 OFDM symbols in a slot is greater than or equal to 1 OFDM symbol and less than or equal to 12 OFDM symbols. The subcarrier index of the initial RE carrying an SRS in a particular OFDM symbol is:

$$\left(\pm (l\bmod 2) * \frac{K_{TC}}{2} + V_{shift}\right)\bmod K_{TC}$$

Further, in certain configurations, when the $K_{TC}$ is 8, the subcarrier index of the initial RE carrying an SRS in a particular OFDM symbol may also be:

$$\left(\pm (l\bmod 2) * \frac{K_{TC}}{2} \pm \left(2 * \left\lfloor \frac{l\bmod 4}{2} \right\rfloor\right)\bmod\left(\frac{K_{TC}}{2}\right) + V_{shift}\right)\bmod K_{TC}$$

FIG. 10 shows a table indicating the subcarrier index of the initial RE carrying an SRS in 12 OFDM symbols with transmission comb sizes 2, 4, and 8 according to the above equations.

As described supra, a phase rotation can be applied to each of the SRS to generate cyclic shift in time domain for SRS transmission. As such, multiple UEs can transmit respective multiple SRSs with different phase rotations in the same REs to achieve multiplexing in time domain. By utilizing the transmission pattern described supra referring to FIGS. 7 and 8, the maximum cyclic shift number can also be increased. For example, in the transmission pattern shown in FIG. 8, with respect to the M1 consecutive OFDM symbols 832 (i.e., the OFDM symbols #0 to #1), the observation range is ½ OFDM symbol time. To maintain the relative time delay allocation at the unit of ¹⁄₄₈ of OFDM symbol time for each UE, the max cyclic shift number is 24. As such, the multiplexing capacity is increased.

A phase rotation can be determined in accordance with the below equation:

$$e^{j\frac{2\pi * m * (n * K_{TC} + (v_{shift} + shift(l))\bmod K_{TC})}{p * N_{max}^{cs} * max\left(1, \frac{K_{TC}}{N_{symbol}^{SRS}}\right)}}$$

$K_{TC}$ is the transmission comb size. For example, $K_{TC}$ can be 2, 4, 8, etc. $N_{max}^{cs}$ is a maximum number of cyclic shifts. For example, when $K_{TC}$ is 2, $N_{max}^{cs}$ is 8; when $K_{TC}$ is 4, $N_{max}^{cs}$ is 12; when $K_{TC}$ is 8, $N_{max}^{cs}$ is 6. p is a parameter for scaling the maximum cyclic shift number. p can be configured as $$P=\min(K_{TC}, N_{symbol}^{SRS}).$$

$N_{symbol}^{SRS}$ is a configured symbol number for an SRS resource (i.e., M1). Further, $$P*\max(1, K_{TC}/N_{symbol}^{SRS})=K_{TC}.$$

In certain configurations, p may be always configured as 1 to keep same maximum cyclic shift number for all observation range through different RE offset pattern. In certain configurations, $K_{TC}$ is greater than or equal to p, and p is greater than or equal to 1.

In certain configurations, m is an integer that is less than $p*N_{max}^{cs}$ and that is greater than or equal to 0. m is used to assign a UE with a cyclic shift index.

The index l is the relative symbol index within an SRS resource. l is greater than or equal to 0 and is less than $N_{symbol}^{SRS}$. The function shift(l) represents the relative RE offset value in each relative symbol index.

n is the index relative to SRS sequence length per symbol. n=0, 1, 2, . . . , Mzc-1. Mzc is the SRS sequence length. $V_{shift}$ is the common comb offset for an antenna port for all symbols in an SRS resource.

When there are more than one antenna ports, a phase rotation can be determined in accordance with the below equation:

$$e^{j\frac{2\pi*((m+port\_offset\_value)\mod(p*N_{max}^{CS}))*(n*K_{TC}+(v_{shift}+shift(l))\mod K_{TC})}{p*N_{max}^{CS}*\max\left(1,\frac{K_{TC}}{N_{symbol}^{SRS}}\right)}}$$

The parameter port_offset_value is pre-configured to indicate that another antenna port is to use different cyclic shift index. The value of port_offset_value is a function of the difference of port index relative to the first antenna port of SRS. This can be treated as CDM behavior between different antenna ports in an SRS resource. $V_{shift}$ can be configured differently for different antenna port in an SRS resource in order to choose different comb offset. This is FDM behavior between different antenna ports in an SRS resource.

Figure 11:
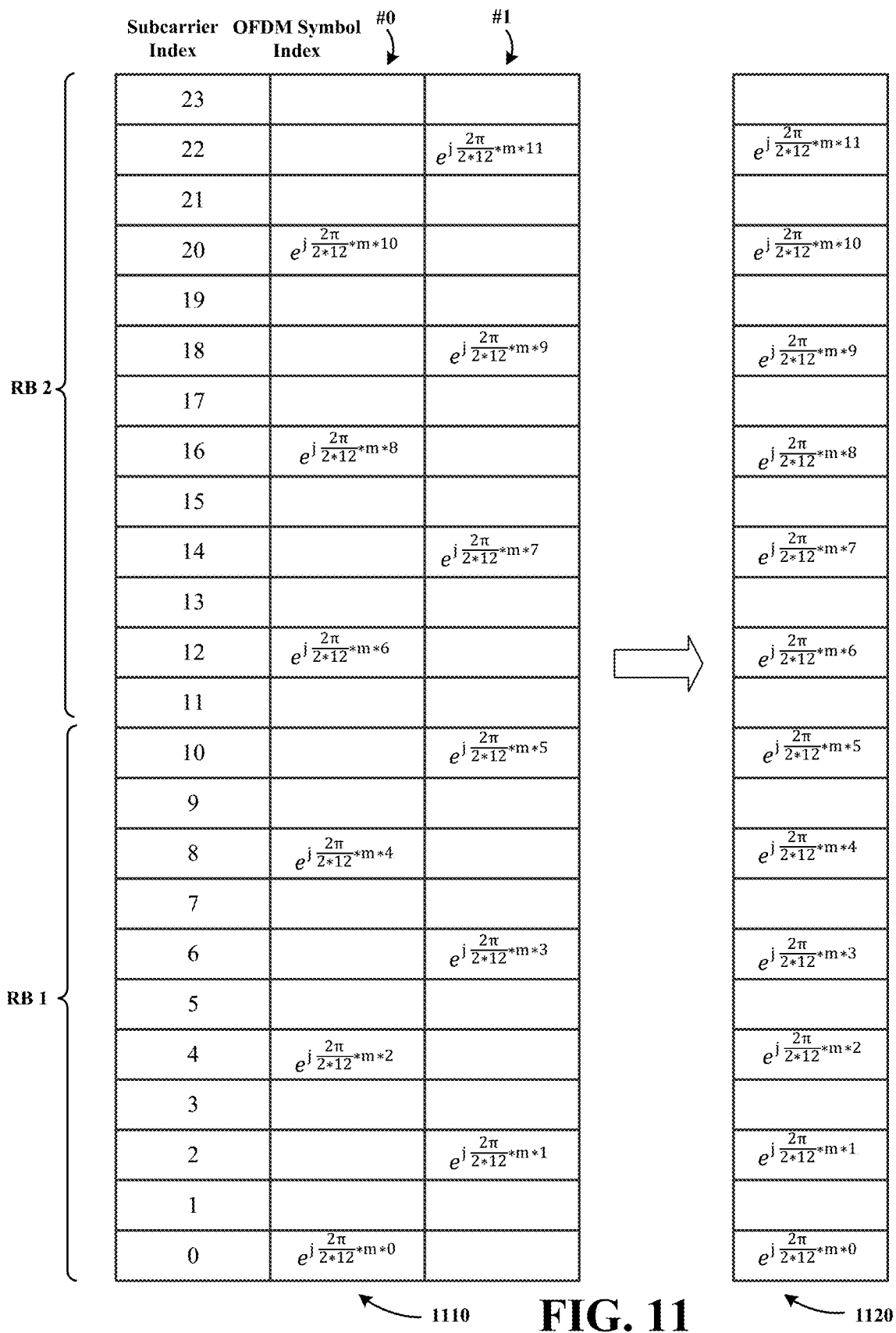
FIG. 11 is a diagram illustrating application of phase rotations to SRSs in a transmission pattern.

FIG. 11 is a diagram illustrating application of phase rotations to SRSs in a transmission pattern 1110. In this example, $K_{TC}$ is 4, $N_{max}^{cs}$ is 12, $N_{symbol}^{SRS}$ is 2, and shift (l)=0, 2, 1, 3 for l=0, 1, 2, 3, 0<=n<6, and $V_{shift}$=0. Further, $p=\min(K_{TC}, N_{symbol}^{SRS})=2$, and $\max(1, K_{TC}/N_{symbol}^{SRS})=2$. SRSs are mapped to REs in OFDM symbols #0 to #1 similarly to what was described supra referring to FIG. 8. A phase rotation determined as described supra is applied to each of the SRSs. For example, a phase rotation of $$e^{j\frac{2\pi}{2*12}*m*0}$$

is applied to the SRS on the subcarrier 0 in the OFDM symbol #0 to generate an SRS with a configured cyclic shift. A phase rotation of $$e^{j\frac{2\pi}{2*12}*m*2}$$

is applied to the SRS on the subcarrier 4 in the OFDM symbol #0 to generate an SRS with a configured cyclic shift.

The base station 702 receives the SRSs transmitted in accordance with the transmission pattern 1110. The received signal $Y_i$ can be represented as follows:

$$Y_i h_i * e^{j*rot_i} * X_i + n_i$$

The subscript i indicates the i-th SRS in a OFDM symbol. The base station 702 perform per-tone channel estimation by dividing the received signal by the reference signal, where $X_i$ is constant modulus. The above equation can be transformed to:

$$\frac{Y_i}{X_i} = h_i * e^{j*rot_i} + \frac{n_i}{X_i}$$

When the receiver (e.g., the base station 702) collapses all the demodulated signals into one OFDM symbol, the linear transmission pattern 1120 can be observed.

Figure 12:
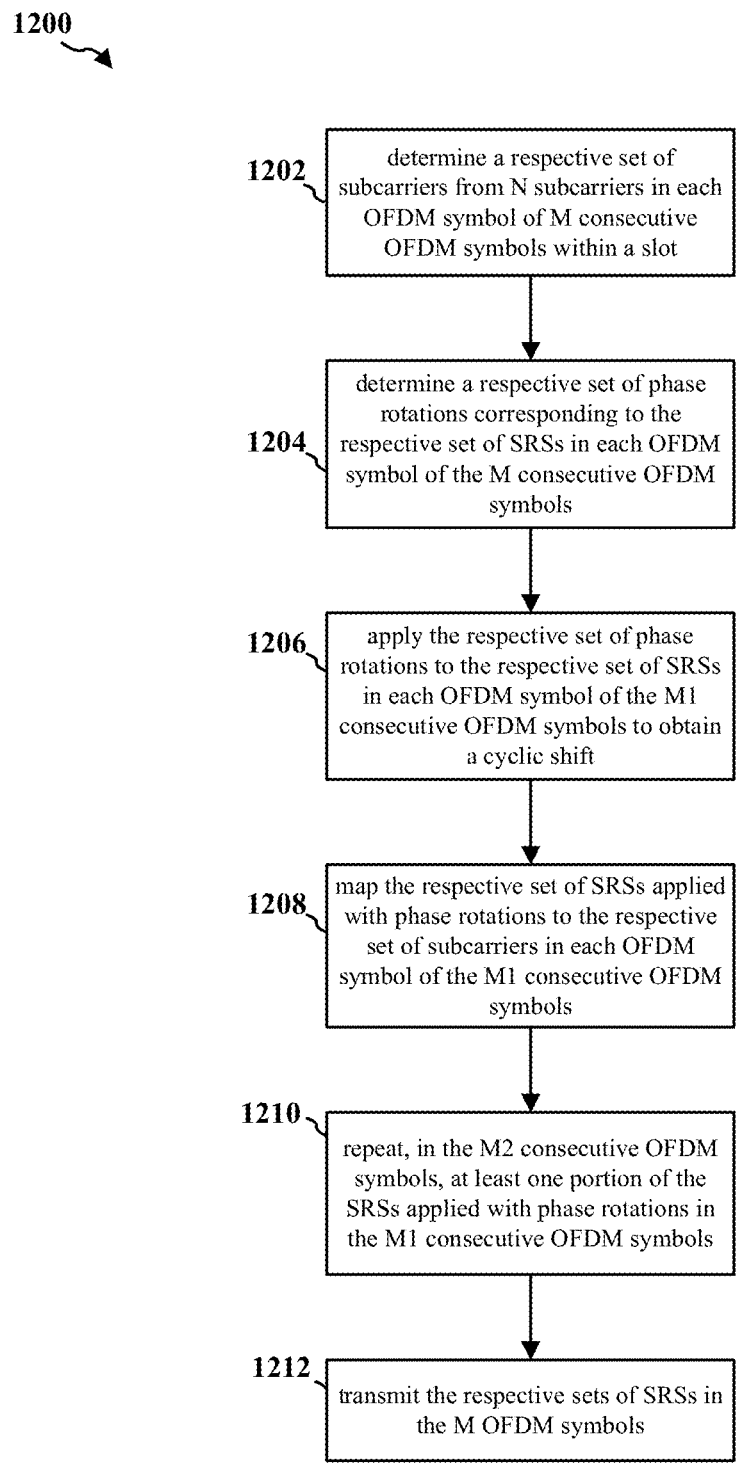
FIG. 12 is a flow chart of a method (process) for generating SRSs.

FIG. 12 is a flow chart 1200 of a method (process) for generating SRSs. The method may be performed by a UE (e.g., the UE 704, the apparatus 1302, and the apparatus 1302'). At operation 1202, the UE determines a respective set of subcarriers from N subcarriers in each OFDM symbol of M consecutive OFDM symbols within a slot. The respective set of subcarriers carries a respective set of sounding reference signals (SRSs) that form transmission combs of a transmission comb size. M OFDM symbols including initial M1 consecutive OFDM symbols and subsequent M2 consecutive OFDM symbols, M and M1 each being an integer greater than 0, M2 being an integer greater than or equal to 0. The respective set of subcarriers in one of the M1 consecutive OFDM symbols do not overlap in frequency domain with the respective set of subcarriers in any other one of the M1 consecutive OFDM symbols.

At operation 1204, the UE determines a respective set of phase rotations corresponding to the respective set of SRSs in each OFDM symbol of the M consecutive OFDM symbols. A given phase rotation $$\left(e.g., e^{j\frac{2\pi}{2*12}*m*2}\right)$$

on the SRS on the subcarrier 4 in the OFDM symbol #0 in FIG. 11) in the respective set further rotates a predetermined phase value $$\left(e.g., \frac{2\pi}{2*12}*m*2\right)$$

than a phase rotation $$\left(e.g., e^{j\frac{2\pi}{2*12}*m*0}\right.$$

on the SRS on the subcarrier 0 in the OFDM symbol #0 in FIG. 11) in the respective set immediately prior to the given phase rotation.

At operation 1206, the UE applies the respective set of phase rotations to the respective set of SRSs in each OFDM symbol of the M1 consecutive OFDM symbols to obtain a cyclic shift. At operation 1208, the UE maps the respective set of SRSs applied with phase rotations to the respective set of subcarriers in each OFDM symbol of the M1 consecutive OFDM symbols.

When M2 is greater than 0, at operation 1210, the UE repeats, in the M2 consecutive OFDM symbols, at least one portion of the SRSs applied with phase rotations in the M1 consecutive OFDM symbols such that all SRSs in the M2 consecutive OFDM symbols are mapped in accordance with the SRSs applied with phase rotations in the M1 consecutive OFDM symbols. At operation 1212, the UE transmits the respective sets of SRSs in the M OFDM symbols.

In certain configurations, the M1 consecutive OFDM symbols and the M2 consecutive OFDM symbols each are sequentially indexed. SRSs in an OFDM symbol of the M2 consecutive OFDM symbols with an index m are mapped in accordance with SRSs in an OFDM symbol of the M1 consecutive OFDM symbols with an index (m mod M1), m being an integer.

In certain configurations, the respective sets of SRSs in the M OFDM symbols are transmitted from a single antenna port of a plurality of antenna ports at the UE. In certain configurations, the transmission comb size is equal to M1. In certain configurations, the transmission comb size is greater than M1.

In certain configurations, when M1 is equal to the transmission comb size and M2 is greater than or equal to 0 or when M1 is less than the transmission comb size and M2 is equal to 0, an index of an initial subcarrier of the respective set of subcarriers in the given OFDM symbol in the M1 consecutive OFDM symbols relative to a reference point is determined by $$\left(\pm (l \bmod K_{TC}) * \frac{K_{TC}}{2} \pm \left\lfloor \frac{l \bmod K_{TC}}{2} \right\rfloor + V_{shift}\right) \bmod K_{TC}.$$

$K_{TC}$ is the transmission comb size and is one of 2, 4, and 8, $V_{shift}$ is a common offset, and l is the index of the given OFDM symbol within the M1 consecutive OFDM symbols.

In certain configurations, when M1 is equal to the transmission comb size and M2 is greater than or equal to 0 or when M1 is less than the transmission comb size and M2 is equal to 0, an index of an initial subcarrier of the respective set of subcarriers in the given OFDM symbol in the M1 consecutive OFDM symbols relative to a reference point is determined by:

$$\left(\pm (l \bmod K_{TC}) * \frac{K_{TC}}{2} \pm \left(2 * \left\lfloor \frac{l \bmod K_{TC}}{2} \right\rfloor\right) \bmod \left(\frac{K_{TC}}{2}\right) \pm \left\lfloor \frac{l \bmod K_{TC}}{4} \right\rfloor + V_{shift}\right) \bmod K_{TC}.$$

$K_{TC}$ is the transmission comb size and is 8, $V_{shift}$ is a common offset, and l is the index of the given OFDM symbol within the M1 consecutive OFDM symbols.

In certain configurations, when M1 is less than the transmission comb size and M2 is greater than 0, an index of an initial subcarrier of the respective set of subcarriers in the given OFDM symbol in the M1 consecutive OFDM symbols relative to a reference point is determined by:

$$\left(\pm (l \bmod 2) * \frac{K_{TC}}{2} + V_{shift}\right) \bmod K_{TC}.$$

$K_{TC}$ is the transmission comb size, $V_{shift}$ is a common offset, and l is the index of the given OFDM symbol within the M1 consecutive OFDM symbols.

In certain configurations, when M1 is less than the transmission comb size and M2 is greater than 0, an index of an initial subcarrier of the respective set of subcarriers in the given OFDM symbol in the M1 consecutive OFDM symbols relative to a reference point is determined by:

$$\left(\pm (l \bmod 2) * \frac{K_{TC}}{2} \pm \left(2 * \left\lfloor \frac{l \bmod 4}{2} \right\rfloor\right) \bmod \left(\frac{K_{TC}}{2}\right) + V_{shift}\right) \bmod K_{TC}.$$

$K_{TC}$ is the transmission comb size and is 8, $V_{shift}$ is a common offset, and l is the index of the given OFDM symbol within the M1 consecutive OFDM symbols.

In certain configurations, a phase rotation applied to a given SRS in a given OFDM symbol of the M1 consecutive OFDM symbols is determined by:

$$e^{j \frac{2\pi * m * (n * K_{TC} + (v_{shift} + shift(l)) \bmod K_{TC})}{p * N_{max}^{cs} * max\left(1, \frac{K_{TC}}{N_{symbol}^{SRS}}\right)}}.$$

$K_{TC}$ is the transmission comb size, $N_{max}^{cs}$ is a predetermined maximum number of cyclic shifts, p is a parameter for scaling the predetermined maximum number of cyclic shifts, l is an index of the given OFDM symbol in the M1 OFDM symbols, n is an index of the given SRS from a sequence generating the respective set of SRSs in the given OFDM symbol, $V_{shift}$ is a common offset, $N_{symbol}^{SRS}$ is M1, shift(l) is a relative offset corresponding l, and $0<=m<p*N_{max}^{cs}$.

In certain configurations, p is $\min(K_{TC}, N_{symbol}^{SRS})$ and $$p * \max\left(1, \frac{K_{TC}}{N_{symbol}^{SRS}}\right) = K_{TC}.$$

In certain configurations, $1<=p<=K_{TC}$.

In certain configurations, the respective sets of SRSs in the M OFDM symbols are associated with a single antenna port of a plurality of antenna ports. A phase rotation applied to a given SRS for an antenna port in a given OFDM symbol of the M1 consecutive OFDM symbols is determined by:

$$e^{j \frac{2\pi * ((m + port\_offset\_value) \bmod (p * N_{max}^{cs})) * (n * K_{TC} + (v_{shift} + shift(l)) \bmod K_{TC})}{p * N_{max}^{cs} * max\left(1, \frac{K_{TC}}{N_{symbol}^{SRS}}\right)}}.$$

port_offset_value is an offset to distinguish the single antenna port from other antenna ports of the plurality of antenna ports, $K_{TC}$ is the transmission comb size, $N_{max}^{cs}$ is a predetermined maximum number of cyclic shifts, p is a parameter for scaling the predetermined maximum number of cyclic shifts, l is an index of the given OFDM symbol in the M1 OFDM symbols, n is an index of the given SRS from a sequence generating the respective set of SRSs in the given OFDM symbol, $V_{shift}$ is a common offset, $N_{symbol}^{SRS}$ is M1, shift(l) is a relative offset corresponding l, and $0<=m<p*N_{max}^{cs}$.

Figure 13:
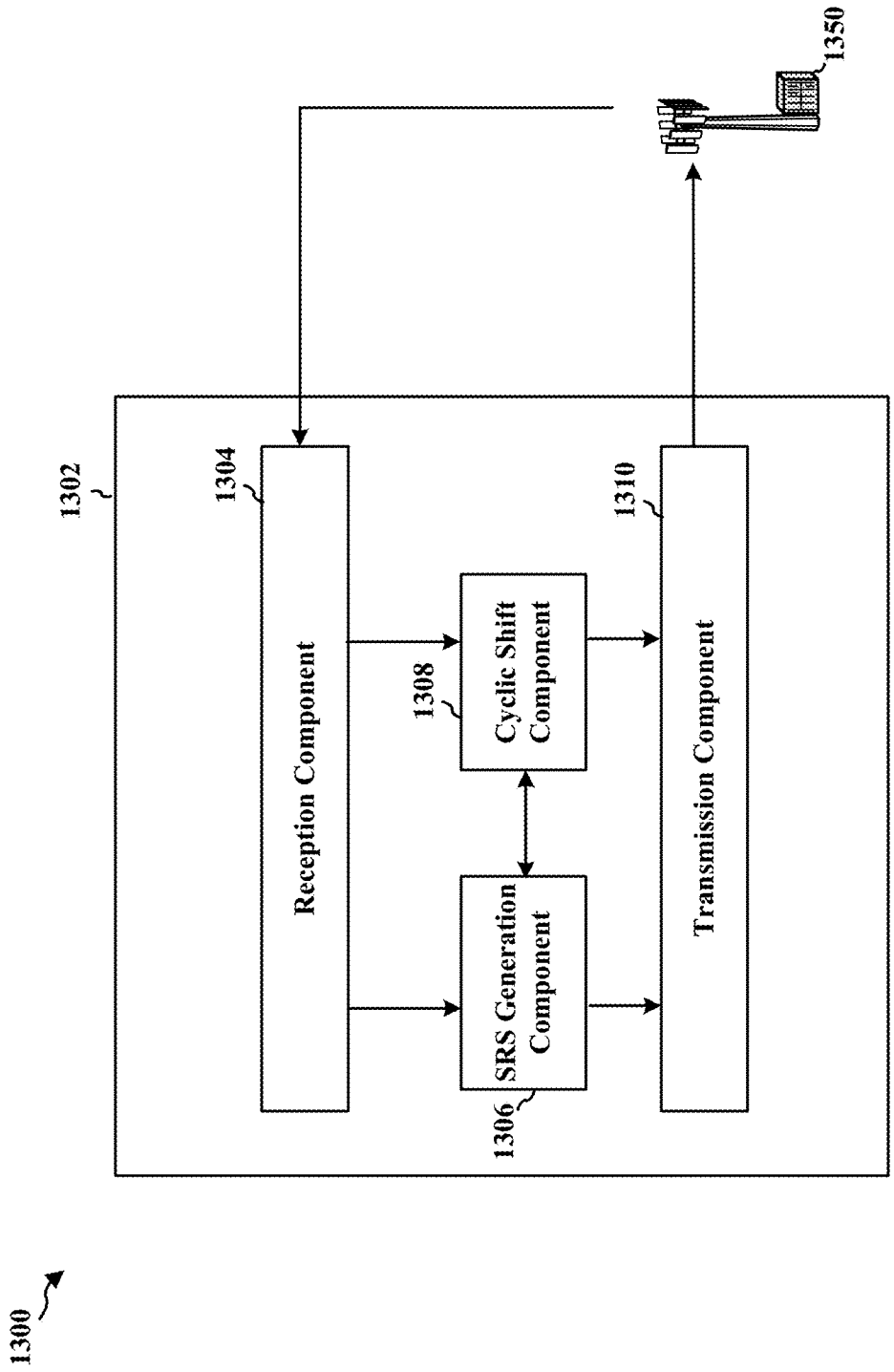
FIG. 13 is a conceptual data flow diagram illustrating the data flow between different components/means in an exemplary apparatus.

FIG. 13 is a conceptual data flow diagram 1300 illustrating the data flow between different components/means in an exemplary apparatus 1302. The apparatus 1302 may be a UE. The apparatus 1302 includes a reception component 1304, an SRS generation component 1306, a cyclic shift component 1308, and a transmission component 1310.

The SRS generation component 1306 determines a respective set of subcarriers from N subcarriers in each OFDM symbol of M consecutive OFDM symbols within a slot. The respective set of subcarriers carries a respective set of sounding reference signals (SRSs) that form transmission combs of a transmission comb size. M OFDM symbols including initial M1 consecutive OFDM symbols and subsequent M2 consecutive OFDM symbols, M and M1 each being an integer greater than 0, M2 being an integer greater than or equal to 0. The respective set of subcarriers in one of the M1 consecutive OFDM symbols do not overlap in frequency domain with the respective set of subcarriers in any other one of the M1 consecutive OFDM symbols.

The cyclic shift component 1308 determines a respective set of phase rotations corresponding to the respective set of SRSs in each OFDM symbol of the M consecutive OFDM symbols. A given phase rotation in the respective set further rotating a predetermined phase value than a phase rotation in the respective set prior to the given phase rotation.

The cyclic shift component 1308 applies the respective set of phase rotations to the respective set of SRSs in each OFDM symbol of the M1 consecutive OFDM symbols to obtain a cyclic shift. The SRS generation component 1306 maps the respective set of SRSs applied with phase rotations to the respective set of subcarriers in each OFDM symbol of the M1 consecutive OFDM symbols.

When M2 is greater than 0, the SRS generation component 1306 repeats, in the M2 consecutive OFDM symbols, at least one portion of the SRSs applied with phase rotations in the M1 consecutive OFDM symbols such that all SRSs in the M2 consecutive OFDM symbols are mapped in accordance with the SRSs applied with phase rotations in the M1 consecutive OFDM symbols. The transmission component 1310 transmits the respective sets of SRSs in the M OFDM symbols.

In certain configurations, the M1 consecutive OFDM symbols and the M2 consecutive OFDM symbols each are sequentially indexed. SRSs in an OFDM symbol of the M2 consecutive OFDM symbols with an index m are mapped in accordance with SRSs in an OFDM symbol of the M1 consecutive OFDM symbols with an index (m mod M1), m being an integer.

In certain configurations, the respective sets of SRSs in the M OFDM symbols are transmitted from a single antenna port of a plurality of antenna ports at the UE. In certain configurations, the transmission comb size is equal to M1. In certain configurations, the transmission comb size is greater than M1.

In certain configurations, when M1 is equal to the transmission comb size and M2 is greater than or equal to 0 or when M1 is less than the transmission comb size and M2 is equal to 0, an index of an initial subcarrier of the respective set of subcarriers in the given OFDM symbol in the M1 consecutive OFDM symbols relative to a reference point is determined by $$\left(\pm(l \bmod K_{TC}) * \frac{K_{TC}}{2} \pm \left\lfloor \frac{l \bmod K_{TC}}{2} \right\rfloor + V_{shift}\right) \bmod K_{TC}.$$

$K_{TC}$ is the transmission comb size and is one of 2, 4, and 8, $V_{shift}$ is a common offset, and l is the index of the given OFDM symbol within the M1 consecutive OFDM symbols.

In certain configurations, when M1 is equal to the transmission comb size and M2 is greater than or equal to 0 or when M1 is less than the transmission comb size and M2 is equal to 0, an index of an initial subcarrier of the respective set of subcarriers in the given OFDM symbol in the M1 consecutive OFDM symbols relative to a reference point is determined by:

$$\left(\pm(l \bmod K_{TC}) * \frac{K_{TC}}{2} \pm \left(2 * \left\lfloor \frac{l \bmod K_{TC}}{2} \right\rfloor\right) \bmod \left(\frac{K_{TC}}{2}\right) \pm \left\lfloor \frac{l \bmod K_{TC}}{4} \right\rfloor + V_{shift}\right) \bmod K_{TC}.$$

$K_{TC}$ is the transmission comb size and is 8, $V_{shift}$ is a common offset, and l is the index of the given OFDM symbol within the M1 consecutive OFDM symbols.

In certain configurations, when M1 is less than the transmission comb size and M2 is greater than 0, an index of an initial subcarrier of the respective set of subcarriers in the given OFDM symbol in the M1 consecutive OFDM symbols relative to a reference point is determined by:

$$\left(\pm(l \bmod 2) * \frac{K_{TC}}{2} + V_{shift}\right) \bmod K_{TC}.$$

$K_{TC}$ is the transmission comb size, $V_{shift}$ is a common offset, and l is the index of the given OFDM symbol within the M1 consecutive OFDM symbols.

In certain configurations, when M1 is less than the transmission comb size and M2 is greater than 0, an index of an initial subcarrier of the respective set of subcarriers in the given OFDM symbol in the M1 consecutive OFDM symbols relative to a reference point is determined by:

$$\left(\pm(l \bmod 2) * \frac{K_{TC}}{2} \pm \left(2 * \left\lfloor \frac{l \bmod 4}{2} \right\rfloor\right) \bmod \left(\frac{K_{TC}}{2}\right) + V_{shift}\right) \bmod K_{TC}.$$

$K_{TC}$ is the transmission comb size and is 8, $V_{shift}$ is a common offset, and l is the index of the given OFDM symbol within the M1 consecutive OFDM symbols.

In certain configurations, a phase rotation applied to a given SRS in a given OFDM symbol of the M1 consecutive OFDM symbols is determined by:

$$e^{j \frac{2\pi * m * \left(n * K_{TC} + \left(v_{shift} + shift(l)\right) \bmod K_{TC}\right)}{p * N_{max}^{CS} * max\left(1, \frac{K_{TC}}{N_{symbol}^{SRS}}\right)}}.$$

$K_{TC}$ is the transmission comb size, $N_{max}^{cs}$ is a predetermined maximum number of cyclic shifts, p is a parameter for scaling the predetermined maximum number of cyclic shifts, l is an index of the given OFDM symbol in the M1 OFDM symbols, n is an index of the given SRS from a sequence generating the respective set of SRSs in the given OFDM symbol, $V_{shift}$ is a common offset, $N_{symbol}^{SRS}$ is M1, shift(l) is a relative offset corresponding l, and $0 <= m < p * N_{max}^{cs}$.

In certain configurations, p is min($K_{TC}$, $N_{symbol}^{SRS}$) and $$p * \max\left(1, \frac{K_{TC}}{N_{symbol}^{SRS}}\right) = K_{TC}.$$

In certain configurations, $1 <= p <= K_{TC}$.

In certain configurations, the respective sets of SRSs in the M OFDM symbols are associated with a single antenna port of a plurality of antenna ports. A phase rotation applied to a given SRS for an antenna port in a given OFDM symbol of the M1 consecutive OFDM symbols is determined by:

$$e^{j \frac{2\pi *((m+port\_offset\_value) mod(p*N_{max}^{CS}))*(n*K_{TC}+(v_{shift}+shift(l)) mod K_{TC})}{p*N_{max}^{CS}*\max\left(1, \frac{K_{TC}}{N_{symbol}^{SRS}}\right)}}.$$

port_offset_value is an offset to distinguish the single antenna port from other antenna ports of the plurality of antenna ports, $K_{TC}$ is the transmission comb size, $N_{max}^{cs}$ is a predetermined maximum number of cyclic shifts, p is a parameter for scaling the predetermined maximum number of cyclic shifts, l is an index of the given OFDM symbol in the M1 OFDM symbols, n is an index of the given SRS from a sequence generating the respective set of SRSs in the given OFDM symbol, $V_{shift}$ is a common offset, $N_{symbol}^{SRS}$ is M1, shift(l) is a relative offset corresponding l, and $0 <= m < p*N_{max}^{cs}$.

Figure 14:
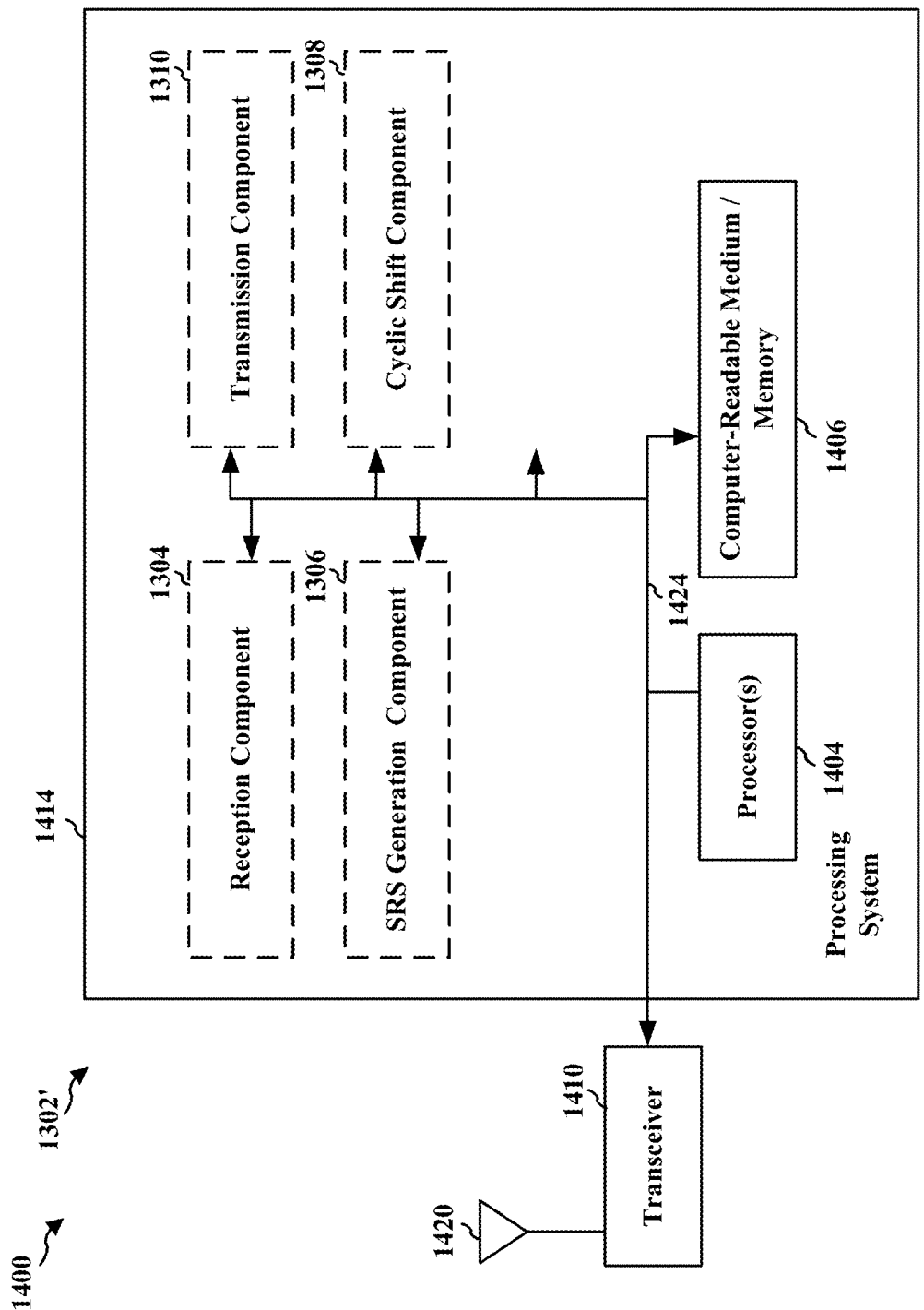
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The apparatus 1302' may be a UE. The processing system 1414 may be implemented with a bus architecture, represented generally by a bus 1424. The bus 1424 may include any number of interconnecting buses and bridges depending on the specific application of the processing system 1414 and the overall design constraints. The bus 1424 links together various circuits including one or more processors and/or hardware components, represented by one or more processors 1404, the reception component 1304, the SRS generation component 1306, the cyclic shift component 1308, the transmission component 1310, and a computer-readable medium/memory 1406. The bus 1424 may also link various other circuits such as timing sources, peripherals, voltage regulators, and power management circuits, etc.

The processing system 1414 may be coupled to a transceiver 1410, which may be one or more of the transceivers 254. The transceiver 1410 is coupled to one or more antennas 1420, which may be the communication antennas 252.

The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1310, and based on the received information, generates a signal to be applied to the one or more antennas 1420.

The processing system 1414 includes one or more processors 1404 coupled to a computer-readable medium/memory 1406. The one or more processors 1404 are responsible for general processing, including the execution of software stored on the computer-readable medium/memory 1406. The software, when executed by the one or more processors 1404, causes the processing system 1414 to perform the various functions described supra for any particular apparatus. The computer-readable medium/memory 1406 may also be used for storing data that is manipulated by the one or more processors 1404 when executing software. The processing system 1414 further includes at least one of the reception component 1304, the SRS generation component 1306, the cyclic shift component 1308, and the transmission component 1310. The components may be software components running in the one or more processors 1404, resident/stored in the computer readable medium/ memory 1406, one or more hardware components coupled to the one or more processors 1404, or some combination thereof. The processing system 1414 may be a component of the UE 250 and may include the memory 260 and/or at least one of the TX processor 268, the RX processor 256, and the communication processor 259.

In one configuration, the apparatus 1302/apparatus 1302' for wireless communication includes means for performing each of the operations of FIG. 17. The aforementioned means may be one or more of the aforementioned components of the apparatus 1302 and/or the processing system 1414 of the apparatus 1302' configured to perform the functions recited by the aforementioned means.

As described supra, the processing system 1414 may include the TX Processor 268, the RX Processor 256, and the communication processor 259. As such, in one configuration, the aforementioned means may be the TX Processor 268, the RX Processor 256, and the communication processor 259 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   determining a respective set of subcarriers from N subcarriers in each OFDM symbol of M1 consecutive OFDM symbols within a slot, M1 being an integer greater than 0, the respective set of subcarriers carrying a respective set of sounding reference signals (SRSs), wherein the respective set of subcarriers in one of the M1 consecutive OFDM symbols do not overlap in frequency domain with the respective set of subcarriers in any other one of the M1 consecutive OFDM symbols;
   determining a respective set of phase rotations corresponding to the respective set of SRSs in each OFDM symbol of the M1 consecutive OFDM symbols, a given phase rotation in the respective set further rotating a predetermined phase value than a phase rotation in the respective set prior to the given phase rotation;
   applying the respective set of phase rotations to the respective set of SRSs in each OFDM symbol of the M1 consecutive OFDM symbols to obtain a cyclic shift;
   mapping the respective set of SRSs applied with the respective set of phase rotations to the respective set of subcarriers in each OFDM symbol of the M1 consecutive OFDM symbols; and
   transmitting the respective sets of SRSs in the M1 OFDM symbols.

2. The method of claim 1, wherein the slot includes M consecutive OFDM symbols including the M1 consecutive OFDM symbols and M2 consecutive OFDM symbols subsequent to the M1 consecutive OFDM symbols, M being an integer greater than 0, M2 being an integer greater than or equal to 0, the method further comprising:
   repeating, in the M2 consecutive OFDM symbols, at least one portion of the SRSs applied with phase rotations in the M1 consecutive OFDM symbols such that all SRSs in the M2 consecutive OFDM symbols are mapped in accordance with the SRSs applied with phase rotations in the M1 consecutive OFDM symbols;
   transmitting the respective sets of SRSs in the M2 OFDM symbols.

3. The method of claim 2, wherein the M1 consecutive OFDM symbols and the M2 consecutive OFDM symbols each are sequentially indexed, wherein SRSs in an OFDM symbol of the M2 consecutive OFDM symbols with an index m are mapped in accordance with SRSs in an OFDM symbol of the M1 consecutive OFDM symbols with an index (m mod M1), m being an integer.

4. The method of claim 2, wherein the respective sets of SRSs in the M OFDM symbols are transmitted from a single antenna port of a plurality of antenna ports at the UE.

5. The method of claim 2, wherein when M1 is equal to a transmission comb size formed from the respective set of SRSs and M2 is greater than or equal to 0 or when M1 is less than the transmission comb size and M2 is equal to 0, an index of an initial subcarrier of the respective set of subcarriers in the given OFDM symbol in the M1 consecutive OFDM symbols relative to a reference point is determined by $$\left( \pm (l \bmod K_{TC}) * \frac{K_{TC}}{2} \pm \left\lfloor \frac{l \bmod K_{TC}}{2} \right\rfloor + V_{shift} \right) \bmod K_{TC}$$

wherein $K_{TC}$ is the transmission comb size and is one of 2, 4, and 8, $V_{shift}$ is a common offset, l is the index of the given OFDM symbol within the M1 consecutive OFDM symbols.

6. The method of claim 2, wherein when M1 is equal to a transmission comb size formed from the respective set of SRSs and M2 is greater than or equal to 0 or when M1 is less than the transmission comb size and M2 is equal to 0, an index of an initial subcarrier of the respective set of subcarriers in the given OFDM symbol in the M1 consecutive OFDM symbols relative to a reference point is determined by:

$$\left( \pm (l \bmod K_{TC}) * \frac{K_{TC}}{2} \pm \left( 2 * \left\lfloor \frac{l \bmod K_{TC}}{2} \right\rfloor \right) \bmod \left( \frac{K_{TC}}{2} \right) \pm \left\lfloor \frac{l \bmod K_{TC}}{4} \right\rfloor + V_{shift} \right) \bmod K_{TC}$$

wherein $K_{TC}$ is the transmission comb size and is 8, $V_{shift}$ is a common offset, l is the index of the given OFDM symbol within the M1 consecutive OFDM symbols.

7. The method of claim 2, wherein when M1 is less than a transmission comb size formed from the respective set of SRSs and M2 is greater than 0, an index of an initial subcarrier of the respective set of subcarriers in the given OFDM symbol in the M1 consecutive OFDM symbols relative to a reference point is determined by:

$$\left( \pm (l \bmod 2) * \frac{K_{TC}}{2} + V_{shift} \right) \bmod K_{TC}$$

wherein $K_{TC}$ is the transmission comb size, $V_{shift}$ is a common offset, and l is the index of the given OFDM symbol within the M1 consecutive OFDM symbols.

8. The method of claim 2, wherein when M1 is less than a transmission comb size formed from the respective set of SRSs and M2 is greater than 0, an index of an initial subcarrier of the respective set of subcarriers in the given OFDM symbol in the M1 consecutive OFDM symbols relative to a reference point is determined by:

$$\left( \pm (l \bmod 2) * \frac{K_{TC}}{2} \pm \left( 2 * \left\lfloor \frac{l \bmod 4}{2} \right\rfloor \right) \bmod \left( \frac{K_{TC}}{2} \right) + V_{shift} \right) \bmod K_{TC}$$

wherein $K_{TC}$ is the transmission comb size and is 8, $V_{shift}$ is a common offset, and l is the index of the given OFDM symbol within the M1 consecutive OFDM symbols.

9. The method of claim 1, wherein a phase rotation applied to a given SRS in a given OFDM symbol of the M1 consecutive OFDM symbols is determined by:

$$e^{j\frac{2\pi*m*(n*K_{TC}+(v_{shift}+shift(l))mod K_{TC})}{p*N_{max}^{CS}*max\left(1,\frac{K_{TC}}{N_{symbol}^{SRS}}\right)}}$$

wherein $K_{TC}$ is the transmission comb size, $N_{max}^{cs}$ is a predetermined maximum number of cyclic shifts, p is a parameter for scaling the predetermined maximum number of cyclic shifts, l is an index of the given OFDM symbol in the M1 OFDM symbols, n is an index of the given SRS from a sequence generating the respective set of SRSs in the given OFDM symbol, $V_{shift}$ is a common offset, $N_{symbol}^{SRS}$ is M1, shift(l) is a relative offset corresponding l, and $0<=m<p*N_{max}^{cs}$.

10. The method of claim 9, wherein p is $\min(K_{TC}, N_{symbol}^{SRS})$ and $$p*\max\left(1,\frac{K_{TC}}{N_{symbol}^{SRS}}\right)=K_{TC}.$$

11. The method of claim 9, wherein $1<=p<=K_{TC}$.

12. The method of claim 1, where the respective sets of SRSs in the M OFDM symbols are associated with a single antenna port of a plurality of antenna ports, wherein a phase rotation applied to a given SRS for an antenna port in a given OFDM symbol of the M1 consecutive OFDM symbols is determined by:

$$e^{j\frac{2\pi*((m+port\_offset\_value)mod(p*N_{max}^{CS}))*(n*K_{TC}+(v_{shift}+shift(l))mod K_{TC})}{p*N_{max}^{CS}*max\left(1,\frac{K_{TC}}{N_{symbol}^{SRS}}\right)}}$$

wherein port_offset_value is an offset to distinguish the single antenna port from other antenna ports of the plurality of antenna ports, $K_{TC}$ is the transmission comb size, $N_{max}^{cs}$ is a predetermined maximum number of cyclic shifts, p is a parameter for scaling the predetermined maximum number of cyclic shifts, l is an index of the given OFDM symbol in the M1 OFDM symbols, n is an index of the given SRS from a sequence generating the respective set of SRSs in the given OFDM symbol, $V_{shift}$ is a common offset, $N_{symbol}^{SRS}$ is M1, shift(l) is a relative offset corresponding l, and $0<=m<p*N_{max}^{cs}$.

13. An apparatus for wireless communication, the apparatus being a user equipment (UE), comprising:
a memory; and
at least one processor coupled to the memory and configured to:
  determine a respective set of subcarriers from N subcarriers in each OFDM symbol of M1 consecutive OFDM symbols within a slot, M1 being an integer greater than 0, the respective set of subcarriers carrying a respective set of sounding reference signals (SRSs), wherein the respective set of subcarriers in one of the M1 consecutive OFDM symbols do not overlap in frequency domain with the respective set of subcarriers in any other one of the M1 consecutive OFDM symbols;
  determine a respective set of phase rotations corresponding to the respective set of SRSs in each OFDM symbol of the M1 consecutive OFDM symbols, a given phase rotation in the respective set further rotating a predetermined phase value than a phase rotation in the respective set prior to the given phase rotation;
  apply the respective set of phase rotations to the respective set of SRSs in each OFDM symbol of the M1 consecutive OFDM symbols to obtain a cyclic shift;
  map the respective set of SRSs applied with the respective set of phase rotations to the respective set of subcarriers in each OFDM symbol of the M1 consecutive OFDM symbols; and
  transmit the respective sets of SRSs in the M1 OFDM symbols.

14. The apparatus of claim 13, wherein the slot includes M consecutive OFDM symbols including the M1 consecutive OFDM symbols and M2 consecutive OFDM symbols subsequent to the M1 consecutive OFDM symbols, M being an integer greater than 0, M2 being an integer greater than or equal to 0, wherein the at least one processor is further configured to:
  repeat, in the M2 consecutive OFDM symbols, at least one portion of the SRSs applied with phase rotations in the M1 consecutive OFDM symbols such that all SRSs in the M2 consecutive OFDM symbols are mapped in accordance with the SRSs applied with phase rotations in the M1 consecutive OFDM symbols; and
  transmit the respective sets of SRSs in the M2 OFDM symbols.

15. The apparatus of claim 14, wherein the M1 consecutive OFDM symbols and the M2 consecutive OFDM symbols each are sequentially indexed, wherein SRSs in an OFDM symbol of the M2 consecutive OFDM symbols with an index m are mapped in accordance with SRSs in an OFDM symbol of the M1 consecutive OFDM symbols with an index (m mod M1), m being an integer.

16. The apparatus of claim 14, wherein the respective sets of SRSs in the M OFDM symbols are transmitted from a single antenna port of a plurality of antenna ports at the UE.

17. The apparatus of claim 14, wherein when M1 is equal to a transmission comb size formed from the respective set of SRSs and M2 is greater than or equal to 0 or when M1 is less than the transmission comb size and M2 is equal to 0, an index of an initial subcarrier of the respective set of subcarriers in the given OFDM symbol in the M1 consecutive OFDM symbols relative to a reference point is determined by $$\left(\pm(l\bmod K_{TC})*\frac{K_{TC}}{2}\pm\left\lfloor\frac{l\bmod K_{TC}}{2}\right\rfloor+V_{shift}\right)\bmod K_{TC}$$

wherein $K_{TC}$ is the transmission comb size and is one of 2, 4, and 8, $V_{shift}$ is a common offset, l is the index of the given OFDM symbol within the M1 consecutive OFDM symbols.

18. The apparatus of claim 14, wherein when M1 is equal to a transmission comb size formed from the respective set of SRSs and M2 is greater than or equal to 0 or when M1 is less than the transmission comb size and M2 is equal to 0, an index of an initial subcarrier of the respective set of subcarriers in the given OFDM symbol in the M1 consecutive OFDM symbols relative to a reference point is determined by:

$$\left(\pm(l\bmod K_{TC})*\frac{K_{TC}}{2}\pm\left(2*\left\lfloor\frac{l\bmod K_{TC}}{2}\right\rfloor\right)\right)\bmod\left(\frac{K_{TC}}{2}\right)\pm\left\lfloor\frac{l\bmod K_{TC}}{4}\right\rfloor+$$

$$V_{shift}) \bmod K_{TC}$$

wherein $K_{TC}$ is the transmission comb size and is 8, $V_{shift}$ is a common offset, l is the index of the given OFDM symbol within the M1 consecutive OFDM symbols.

19. The apparatus of claim 14, wherein when M1 is less than a transmission comb size formed from the respective set of SRSs and M2 is greater than 0, an index of an initial subcarrier of the respective set of subcarriers in the given OFDM symbol in the M1 consecutive OFDM symbols relative to a reference point is determined by:

$$\left( \pm (l \bmod 2) * \frac{K_{TC}}{2} + V_{shift} \right) \bmod K_{TC}$$

wherein $K_{TC}$ is the transmission comb size, $V_{shift}$ is a common offset, and l is the index of the given OFDM symbol within the M1 consecutive OFDM symbols.

20. A method of wireless communication of a base station, comprising:
receiving a respective set of sounding reference signals (SRSs) on a respective set of subcarriers from N subcarriers in each OFDM symbol of M1 consecutive OFDM symbols within a slot, M1 being an integer greater than 0, wherein the respective set of subcarriers in one of the M1 consecutive OFDM symbols do not overlap in frequency domain with the respective set of subcarriers in any other one of the M1 consecutive OFDM symbols; and
determining a respective set of phase rotations corresponding to the respective set of SRSs in each OFDM symbol of the M1 consecutive OFDM symbols, a given phase rotation in the respective set further rotating a predetermined phase value than a phase rotation in the respective set prior to the given phase rotation.

* * * * *